United States Patent [19]

Kovanov et al.

[11] 4,072,109
[45] Feb. 7, 1978

[54] PNEUMATICALLY CONVEYED CONTAINER WITH AIR TIGHT SEALING AND GUIDE MEANS

[76] Inventors: Pavel Vasilievich Kovanov, B. Bronnaya ulitsa, 19/21, kv. 23; Ivan Mikhailovich Torochkov, ulitsa Gorkogo, 41, kv. 99; Ivan Timofeevich Zonenko, Saperny proezd, 8, korpus 3, kv. 72; Adolf Moritsovich Alexandrov, Federativny prospekt, 6, korpus 3, kv. 8; Vladimir Efimovich Aglitsky, Zatsepsky val, 6/13, kv. 61; Jury Abramovich Tsimbler, Sojuzny prospekt, 10, kv. 261; Ilya Solomonovich Kantor, Malo-Moskovskaya ulitsa, 31, kv. 45; Jury Arnoldovich Topolyansky, Matveevskaya ulitsa, 10, korpus 4, kv. 233; Mikhail Vladimirovich Lurie, Veernaya ulitsa, 40, korpus 3, kv. 43, all of Moscow, U.S.S.R.

[21] Appl. No.: 668,444

[22] Filed: Mar. 19, 1976

[51] Int. Cl.² .................................. B61B 13/10
[52] U.S. Cl. ........................... 104/138 R; 104/23 FS; 104/155; 243/39
[58] Field of Search ............... 104/138 R, 134, 23 FS, 104/155; 105/365; 243/38, 39

[56] References Cited

U.S. PATENT DOCUMENTS

| 1,183,198 | 5/1916 | Hills | 243/32 |
|---|---|---|---|
| 3,332,361 | 7/1967 | Bertin et al. | 104/23 FS X |
| 3,384,031 | 5/1968 | Dashen et al. | 104/138 R |
| 3,385,390 | 5/1968 | Goienne | 104/134 X |
| 3,511,186 | 5/1970 | Barthalon | 104/23 FS X |
| 3,952,667 | 4/1976 | Kovanov et al. | 104/138 R |
| 4,023,500 | 5/1977 | Diggs | 104/23 FS |

*Primary Examiner*—Robert J. Spar
*Assistant Examiner*—Carl Rowold
*Attorney, Agent, or Firm*—Fleit & Jacobson

[57] ABSTRACT

The container according to the invention is intended for pneumatic transportation of loads through a pipeline. The container comprises a body which is provided at the ends with a front cup and a rear cup, said front and rear caps closing the lower and upper halves, respectively, of the gap between the container body and the pipeline. Arranged on the sides of the body are longitudinal cups which rest on guides secured to the internal side wall of the pipeline and serve as sliding supports for the container. Each longitudinal cup is connected with the body by a device mounted on said body and intended for resilient pressing of said cup against the guide and by a partition which seals off the gap between the body and said longitudinal cup and permits the body to move vertically relative to the longitudinal cup.

4 Claims, 5 Drawing Figures

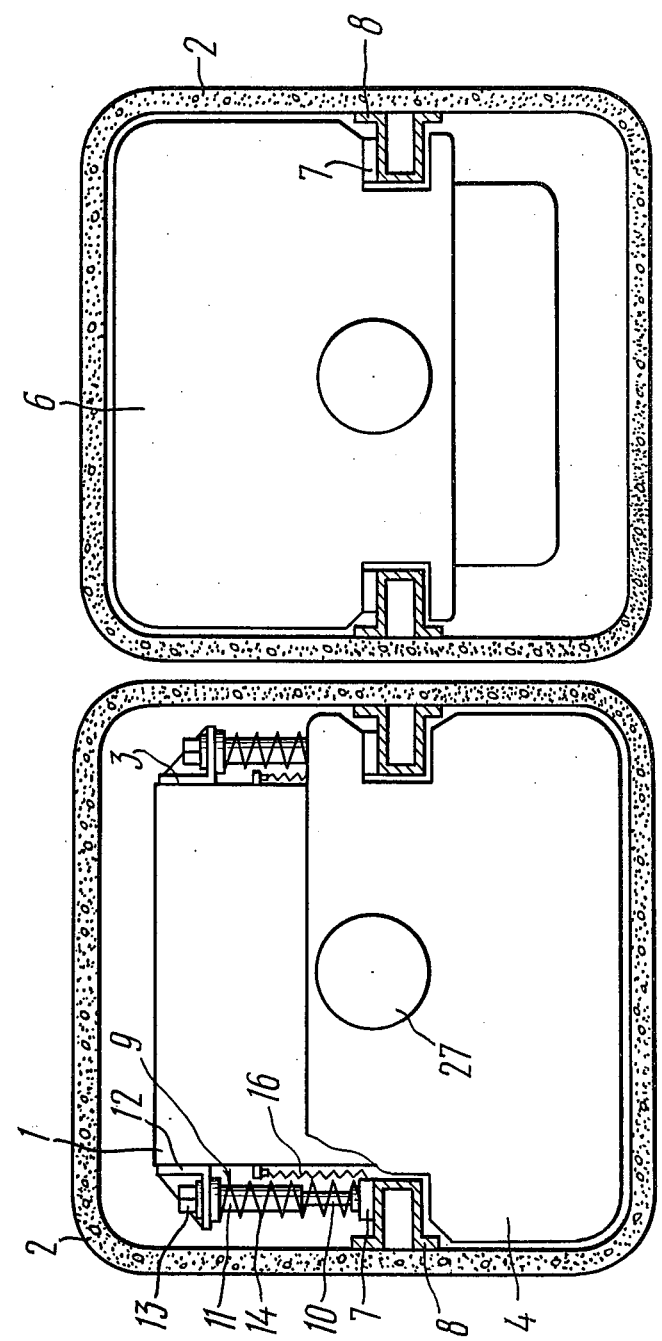

PNEUMATICALLY CONVEYED CONTAINER WITH AIR TIGHT SEALING AND GUIDE MEANS

The present invention relates to pneumatic pipeline transportation of loads in containers and more particularly it relates to containers for such transportation.

It is most practicable that the containers according to the present invention should be used in the pipelines with an inside diameter of 1 m and over.

Known in the previous art are containers for pneumatic pipeline transportation comprising a body (to accommodate the load) provided with front and rear cups at the end. The front cup is mounted on the front end surface of the container (as the container moves) and seals the lower half of the gap between the container body and the pipeline. The rear cup is located at the opposite face surface of the container and seals the upper half of the gap between the container body and the pipeline. Taken together, said front and rear cups close completely the cross-sectional area of the pipeline. Secured rigidly between said front and rear cups on the sides of the container are longitudinal cups. Said longitudinal cups seal the gap between the side walls of the container and the pipeline and serve simultaneously as sliding supports for the moving container. The longitudinal cups rest on the guides secured on the internal side wall of the pipeline.

In the above-described containers the longitudinal cups are rigidly fastened to the container body. In the course of operation, owing to the surface irregularities of the contacting guides and longitudinal cups and the changes in the pressure difference acting on the container moving through the pipeline, also owing to breaking of the longitudinal cups away from the guides under the effect of the lifting force, gaps are formed between the longitudinal cups and the guides; the air starts leaking through these gaps thus reducing the lifting force. As a result, the power expenditures are increased and the movement of containers becomes insufficiently stable.

An object of the present invention is to provide a container for pneumatic pipeline transportation wherein the longitudinal cups would be so secured on the container body as to ensure a minimum or, practically, zero clearance between the longitudinal cups of the container and the pipeline guides in the course of container service.

Another object of the present invention is to extend the service life of the longitudinal cups and guides by improving the stability of container movement with a minimum load applied to the guides.

Still another object of the present invention is to reduce power expenditures during container operation.

In accordance with these and other objects we hereby provide a container for pneumatic pipeline transportation whose body is provided at the ends with a front cup (as the container moves) and a rear cup, said front and rear cups closing the lower and upper halves, respectively, of the gap between the container body and the pipeline, said container being also provided on the sides with longitudinal cups serving as sliding supports for the container, said longitudinal cups being located between said front and rear cups and resting on guides secured to the internal side wall of the pipeline wherein, according to the invention, each longitudinal cup is installed at a certain distance from the container body and connected with the latter by a device mounted on said body and intended for resilient pressing of said cup against the corresponding guide and by a partition one side of which is fastened to the body while its other side is fastened to the longitudinal cup, said partition permitting the body to move vertically relative to said longitudinal cup and sealing the gap between the body and said cup.

It is practicable that the device for resilient pressing of the longitudinal cup against the guide should comprise a spindle one end of which should be connected with the longitudinal cup spring-loaded in the direction of this spindle while its other end should be installed in a guide bushing cantilevered to the container body.

This layout of the device is simplest in design, easy to manufacture and reliable in service.

The end of the spindle can also be connected with the longitudinal cup by means of a cylindrical joint whose axis is parallel to the container axis in which case the surface of the guide contacting the longitudinal cup should be inclined to the vertical plane of symmetry of the pipeline so as to ensure self-alignment of the moving container.

It is practicable that the partition should be made of a flexible material with corrugations arranged parallel to the container axis.

This is the simplest design of the partition.

The container for pneumatic pipeline transportation of loads according to the present invention compensates for possible surface irregularities of the guides, ensures stable movement of the container with minimum loading of the guides and a minimum, practically zero, clearance in the horizontal plane between the longitudinal cups and the pipeline guide, thus increasing the life of the longitudinal cups and reducing the power required for operation of the installation.

Now the invention will be described in detail by way of example with reference to the accompanying drawings.

FIG. 2 is a view along arrow A in FIG. 1 with a partial cutout, enlarged;

FIG. 3 is a view along arrow B in FIG. 1, enlarged;

Figure 1:
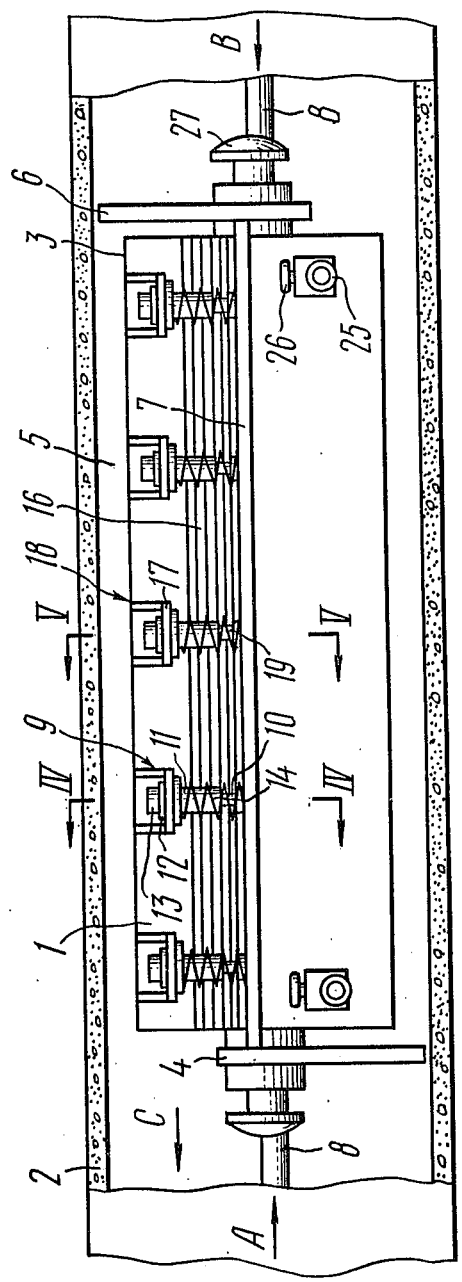
FIG. 1 is a general side view of the container for pneumatic pipeline transportation according to the invention.

The container 1 (FIG. 1) for pneumatic transportation of loads through the pipeline 2 comprises a body 3 for accommodating the loads. Installed on the front face side of the body 3 (in the direction of container movement shown by arrow C) is the front cup 4 (FIGS. 1, 2) which seals the lower half of the circular gap 5 between the container body 3 and the pipeline 2.

The rear cup 6 (FIGS. 1, 3) installed on the opposite face side of the body 3 seals the upper half of the circular gap 5.

Taken together, the front and rear cups 4 and 6 seal off the cross-sectional area of the pipeline 2.

Mounted on the opposite side walls of the container body 3 are longitudinal cups 7 (FIG. 1) located between the front and rear cups 4 and 6. The longitudinal cups 7 rest on guides 8 (FIGS. 2 and 3) which are rigidly secured to the opposite side walls of the pipeline 2 throughout its length. The longitudinal cups 7 serve as sliding supports for the container moving through the pipeline 2.

Figure 4:
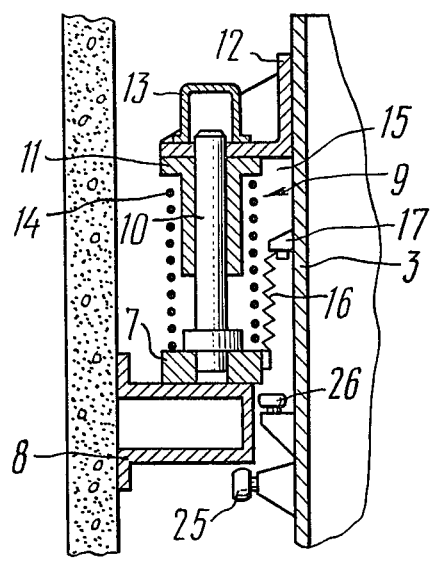
FIG. 4 is a section taken along line IV — IV in FIG. 1, enlarged.

Each longitudinal cup 7 is installed at a certain distance from the body 3 and is connected with the latter by a device 9 intended for resilient pressing of said cup against the corresponding guide 8. The required number of these devices is selected in accordance with the length of the container. Each device 9 comprises a spindle 10 (FIG. 4) one end of which is rigidly connected with the longitudinal cup 7 while its other end is installed in a guide bushing 11 rigidly connected with a bracket 12 which, in turn, is secured on the body 3. The bracket 12 has a through hole to receive the moving spindle 10, said hole being closed with a cover 13 on the top. A coil spring 14 located between the longitudinal cup 7 and the bushing 11 presses the cup 7 against the guide 8. The gap 15 between the body 3 and the longitudinal cup 7 is sealed by a partition 16 (FIGS. 1, 4) made of a flexible material, e.g. rubberized fabric, with corrugations arranged parallel to the axis of the container 1. One longitudinal side of the partition 16 is connected with the body 3 by brackets 17 while its other side is connected with the longitudinal cup 7.

The partitions 16 made of a corrugated flexible material permits the container body 3 to move vertically relative to the longitudinal cups 7.

Figure 5:
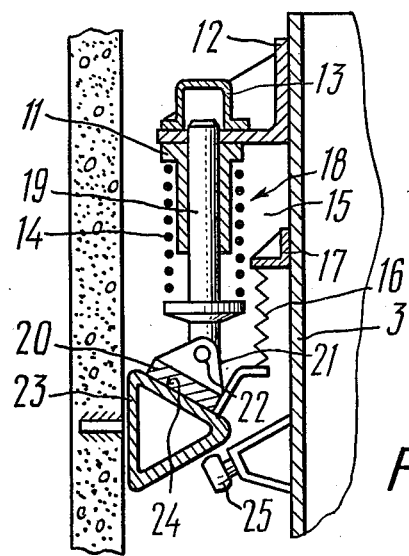
FIG. 5 is a section taken along line V — V in FIG. 1, another version of the device, enlarged.

In another version of the device 18 (FIG. 5) the end of the spindle 19 is fastened to the longitudinal cup 20 by cylindrical joints 21 whose axes 22 are parallel to the axis of the container 1. In the guide 23 secured to the internal side wall of the pipeline 2 the surface 24 contacting the longitudinal cup 20 is inclined to the vertical plane of symmetry of the pipeline 2 so that the moving container 1 is self-aligned under its own weight.

This articulation of the end of the spindle 20 to the longitudinal cup 20 and the inclination of the surface 24 of the guide 23 to the vertical plane of symmetry of the pipeline allow the moving container 1 to be self-aligned under its own weight.

Installed on the body 3 (FIGS. 1, 4) of the container 1 are rollers 25 limiting the maximum lift of the container 1, and rollers 26 (FIG. 4) ensuring self-alignment of the container.

Buffers 27 mounted on the ends of the container serve for gripping the container at the arrival and departure stations.

The container for the pneumatic pipeline transportation functions as follows.

Before the beginning of movement the longitudinal cups 7 of the container rest on the guides 8. As compressed air is fed into the pipeline 2 and there arises a pressure difference on the cups 4 and 6, the container 1 is set in motion. The front cup 4 which seals off the lower half of the gap 5 between the container body 3 and the pipeline 2, and the longitudinal cups 7 sealing the gap between the side walls of the container 1 and the pipeline 2 form a space under the container 1 whereas the rear cup 6 sealing off the upper half of the gap 5 and the longitudinal cups 7 form a space above the container 1.

Both spaces are separated from each other.

The difference of pressures on the longitudinal cups 7 creates a lifting force which moves the container 1 in the required direction on an air cushion. The rollers 25 limit the maximum lift of the container 1 whereas the rollers 26 align it in a horizontal plane.

As the container 1 rises in motion, the longitudinal cups 7 serving as sliding supports are pressed by the device 9 against the guides 8. The spindle 10 one end of which is rigidly connected to the longitudinal cup 7 is forced down by the coil spring 14 in the guide bushing 11.

In spite of the surface irregularities of the guides and the pressure changes in the pipeline, the gap between the longitudinal cups 7 and the guides 8 is minimum or practically nonexistent which rules out the air leaks and, consequently, reduces the power expenditures.

In another version of the device 18 the longitudinal cup 20 is connected with the spindle 19 by a cylindrical joint 21 whose axis 22 is parallel to that of the container 1. The longitudinal cup 20 is pressed by the spring 14 against the guide 23 whose surface 24 is inclined to the vertical plane of symmetry of the pipeline 2.

Due to their articulation to the spindles 19, the longitudinal cups 20 of the container 1 are self-aligned in the guides 23 while the container 1 is self-aligned in the pipeline 2 under its own weight.

What is claimed is:

1. A container for pneumatic transportation of loads through a pipeline wherein the internal surface of the pipeline has guides located opposite each other throughout the pipeline length, said container comprising: a body; a front cup means mounted on the front end face of said body in the direction of movement of said body for sealing off the lower half only of the gap between said body and the pipeline; a rear cup means mounted on the rear end face or said body for sealing off the upper half only of the gap between said body and pipeline; longitudinal cup means located on the sides of said body and extending between said front and rear cup means, said longitudinal cup means resting on said guides located in said pipeline and serving as sliding supports for the container during movement; said longitudinal cup means installed at a certain distance from the sides of said body; means for resilient pressing of said longitudinal cup means against said guides and for connecting said longitudinal cup means with said body; a plurality of partitions located along the sides of said body, each partition secured to said body at one side and secured to the corresponding longitudinal cup means at the other side; said partitions permitting vertical motion of said body relative to said longitudinal cup means and for sealing the gap between said body and said longitudinal cup means.

2. A container according to claim 1 wherein said means for resilient pressing of the longitudinal cup means against the guide comprises a spindle, one end of said spindle connected with the longitudinal cup means, the other end of said spindle installed in a guide bushing cantilevered to the container body, and spring means for pressing the longitudinal cup means against the guide.

3. A container according to claim 2 wherein said one end of the spindle is articulated to the longitudinal cup means by a cylindrical joint whose axis is parallel to that of the container and wherein the surface of the guide contacting the longitudinal cup means is inclined to the vertical plane of symmetry of the pipeline so that the moving container is self-aligned.

4. A container according to claim 1 wherein the partition is made of a flexible material with corrugations arranged essentially parallel to the axis of the container.

* * * * *